United States Patent
Roy et al.

(10) Patent No.: US 11,740,882 B2
(45) Date of Patent: Aug. 29, 2023

(54) MODULAR SOFTWARE INTEGRATION TOOLS AND SYSTEMS

(71) Applicant: OMNI TECHNOLOGIES, Aberdeen Proving Ground, MD (US)

(72) Inventors: JaMarcus Roy, Aberdeen Proving Ground, MD (US); Gerald Williams, Aberdeen Proving Ground, MD (US)

(73) Assignee: OMNI TECHNOLOGIES, Aberdeen Proving, MD (US)

( * ) Notice: Subject to any disclaimer, the term of this patent is extended or adjusted under 35 U.S.C. 154(b) by 0 days.

(21) Appl. No.: 17/409,567

(22) Filed: Aug. 23, 2021

(65) Prior Publication Data

US 2022/0083321 A1    Mar. 17, 2022

Related U.S. Application Data

(60) Provisional application No. 63/068,978, filed on Aug. 21, 2020.

(51) Int. Cl.

| | |
|---|---|
| *G06F 17/00* | (2019.01) |
| *G06F 16/25* | (2019.01) |
| *G06F 9/445* | (2018.01) |
| *G06F 9/455* | (2018.01) |
| *G06F 8/60* | (2018.01) |
| *G06F 21/53* | (2013.01) |
| *G06F 9/54* | (2006.01) |

(52) U.S. Cl.
CPC ............... *G06F 8/60* (2013.01); *G06F 9/541* (2013.01); *G06F 21/53* (2013.01); *G06F 2221/033* (2013.01)

(58) Field of Classification Search
CPC . G06F 8/60; G06F 9/541; G06F 21/53; G06F 2221/033
See application file for complete search history.

(56) References Cited

U.S. PATENT DOCUMENTS

| | | | |
|---|---|---|---|
| 10,824,591 B2 * | 11/2020 | Venkataraman | ........ G06F 16/13 |
| 2019/0180039 A1 * | 6/2019 | Considine | .......... G06Q 10/0635 |
| 2019/0265957 A1 * | 8/2019 | Risbood | ................ G06F 9/5072 |
| 2020/0036599 A1 * | 1/2020 | Savov | .................. H04L 67/561 |
| 2020/0228397 A1 * | 7/2020 | Chandrashekar | ....... H04L 67/60 |
| 2020/0358876 A1 * | 11/2020 | Kulkarni | ................. H04L 67/10 |
| 2021/0377263 A1 * | 12/2021 | Law | ........................ G06F 21/32 |
| 2022/0060431 A1 * | 2/2022 | Vadayadiyil Raveendran | ............ H04L 41/12 |

OTHER PUBLICATIONS

Song et al., Customizing Multi-Tenant SaaS by Microservices: A Reference Architecture, 3 pages (Year: 2019).*

* cited by examiner

*Primary Examiner* — Thuy Dao
(74) *Attorney, Agent, or Firm* — Wood IP Law

(57) ABSTRACT

There is provided a system, including an application configured to cause a computing system to execute a set of instructions. The system also includes a back-end engine configured to render the application compatible for deployment on each of at least two cloud environments, wherein the at least two cloud environments have different architectures or protocols.

6 Claims, 20 Drawing Sheets

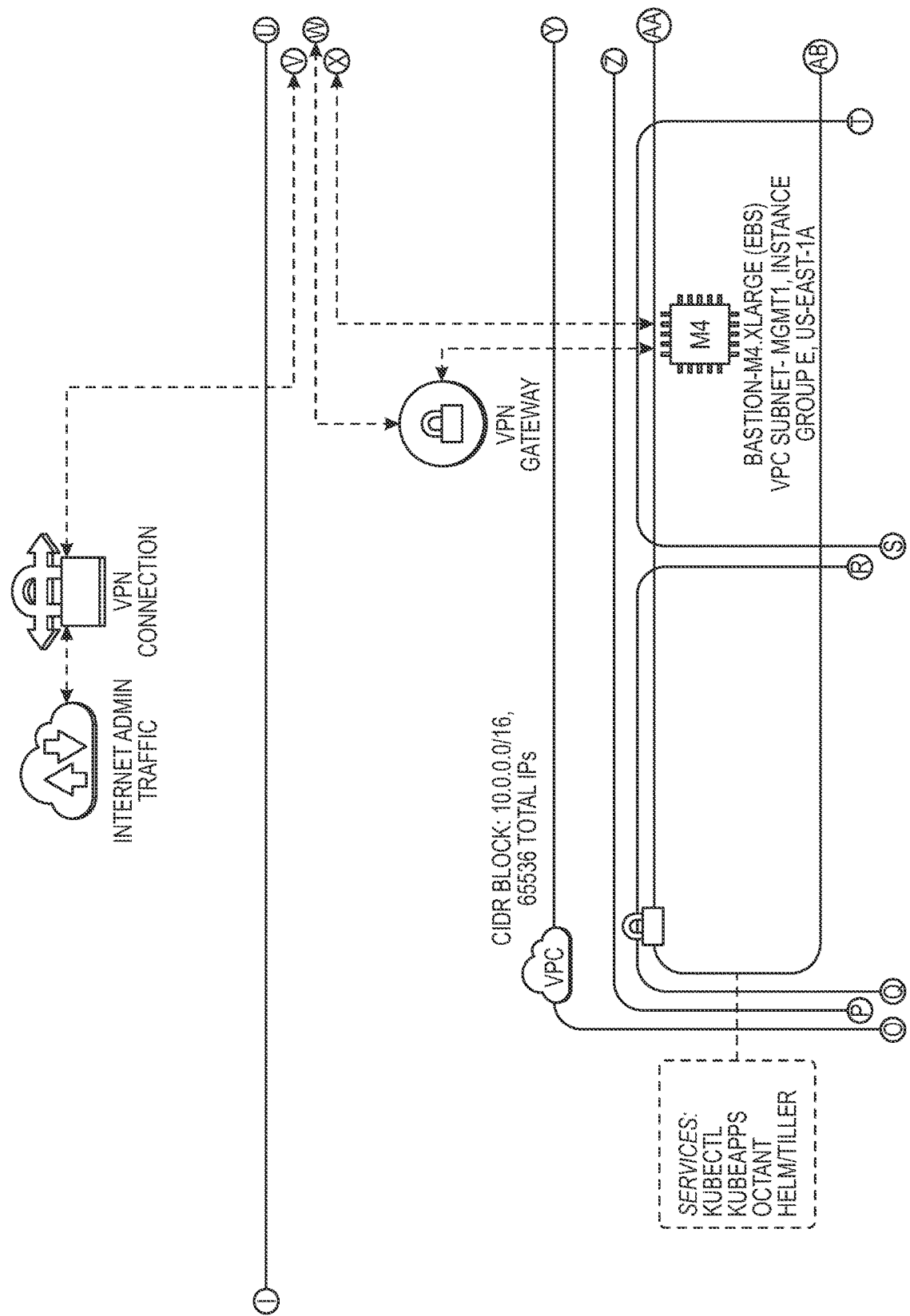

MODULAR SOFTWARE INTEGRATION TOOLS AND SYSTEMS

I. TECHNICAL FIELD

The present invention relates generally to system engineering, cybersecurity, software development, system administration, and system integration. In particular, the present invention relates to software engineering and software integration.

II. BACKGROUND

In the software industry today, software development teams are creating different features and functions from a software solution perspective to solve innumerable functions. Whether the number of functions is merely a handful or millions, those teams today must invariably and meticulously integrate multitudes of different software solutions to produce a desirable end-state. Some of these solutions will be open source, while other solutions may be internally developed solutions (i.e. customized code).

An additional issue encountered by software development teams today is the ability to analyze the customized code against different predetermined benchmarks. There are various software tools available for use that can scan the code. These tools, however, are limited in scope. For example, some tools scan for bugs, others search for vulnerabilities, and yet other tools analyze compliance standards, such as NIST and IEEE. There are no available tools, however, that examine all of these aspects collectively, together.

A specific challenge created by the aforementioned deficiencies becomes more apparent considering specific examples and attributes of cloud computing and distributed computing. Software developers must build their own products and capabilities to perform in such a way that they are agnostic to the end-state, or the underlying platform. The platform can exist, but needs to meet a minimum specification, such as compute space.

By way of example, Amazon, Microsoft, and Google have their own development operations. These companies also have their own products and solutions that can be purchased inside of the compute space of their respective platforms. The challenge arises because when a developer builds with tools from these companies in their corresponding compute space, the developer is tied to the respective company's tools and the aforementioned compute space. At this point, the products and capabilities are no longer agnostic. Instead, they are specifically linked to the company's underlying environment, and to their ecosystem.

Consider another example. As understood by those of skill in the art, a style sheet is a type of file or guide used mainly by front end software developers. The style sheet is a type of file which tells a web browser how to render a webpage. Style sheets must be formatted in a specific manner and meet specified benchmarks to render an image in a manner desired to be seen by a user. For organizations that have web-based applications, having the capability to define the appearance of the style sheet so that all the developers are creating against that same benchmark, is a key feature. Being able to technically implement this key feature, however, is easier said than done.

The capability exists today for the organization to send the style sheet to the developer indicating "start here." The capability does not exist today to map against the style sheet to ensure what is produced (i.e., part of what propagates through the development pipeline) also meets the specified benchmarks.

III. SUMMARY

The embodiments featured herein help solve or mitigate the above noted deficiencies as well as other issues known in the art. For instance, exemplary systems and methods as described below, provide a robust software integration process focused on compliance. In focusing on compliance, the inventors of the present application provided for more control of other specific components within the development process because there is a perception that compliance represents a focus on security generally, and cyber-security, in particular.

For example, in some embodiments, the inventors adopt a focus on system engineering attributes. In so doing, the inventors recognized the need to tie development operations to security. As understood by those of skill in the art, this industry is widely known as development operations (DEVOPS), development security operations (DEVSECOPS), and security development operations (SECDEVOPS). Thus, out of compliance, the inventors' open-source products are developed and tied together in a unique approach the inventors define as a pipeline. As used herein, the term pipeline is defined as (a) building the code, (b) analyzing the code, and (c) deploying the code.

As a preliminary matter, the inventors treat the concept of compliance as being twofold. That is, compliance represents established standards that are adopted by the industry, such as ISO, NIST, industry best practices, engineering paradigms, and the like. Compliance also includes intellectual knowledge. Intellectual knowledge includes technical know-how, things that engineers know how to do that are proven in the trenches, based on years of experience. Intellectual knowledge may exist about a concept although it has not been adopted by industry, that could be for a variety of reasons. For example, there could be a lack of motivation to go through any specific groups or organizations to get the implementation or method adopted or become part of a standard ($IC^2$, IEEE etc.).

Under certain circumstances, an embodiment of the present invention provides a system including an application configured to cause a computing system to execute a set of instructions. The system also includes a back-end engine configured to render the application compatible for deployment on each of at least two computing services including servers, storage, databases, networking, software, analytics, and intelligence over the Internet ("the cloud") and/or on-premise installed locally, on a company's private computers and servers to offer faster innovation, flexible resources, and economies of scale. These computing services are commonly known as cloud environments, infrastructures or platforms, wherein at least two cloud environments have different architectures, protocols or application programming interfaces (API)

Additional features, modes of operations, advantages, and other aspects of various embodiments are described below with reference to the accompanying drawings. It is noted that the present invention is not limited to the specific embodiments described herein. These embodiments are presented for illustrative purposes only. Additional embodiments, or modifications of the embodiments disclosed, will be readily apparent to persons skilled in the relevant art(s) based on the teachings provided.

IV. BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

FIGS. 12A-12F is a block diagram of exemplary components of various embodiments of the invention.

V. DETAILED DESCRIPTION

Figure 1:
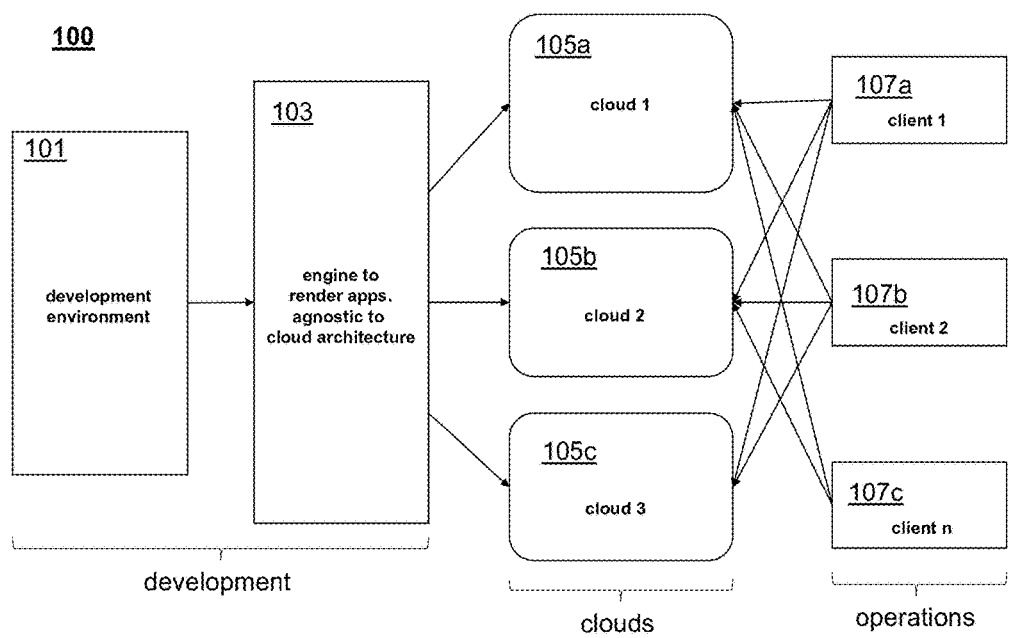
FIG. 1 illustrates an exemplary system according to the embodiments.
Figure 2:
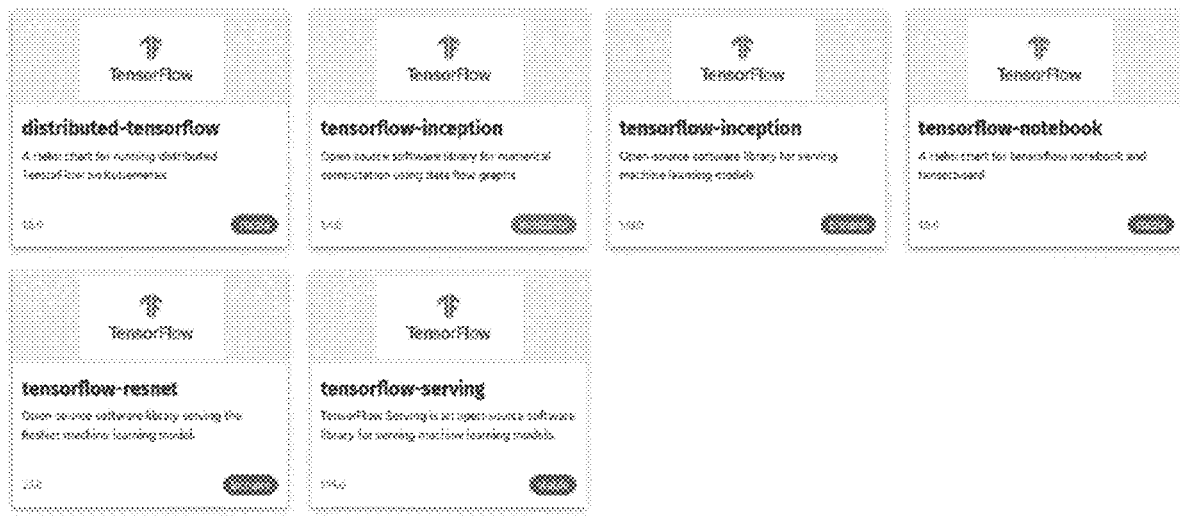
FIG. 2 illustrates a catalog of exemplary tensorflow features.
Figure 3:
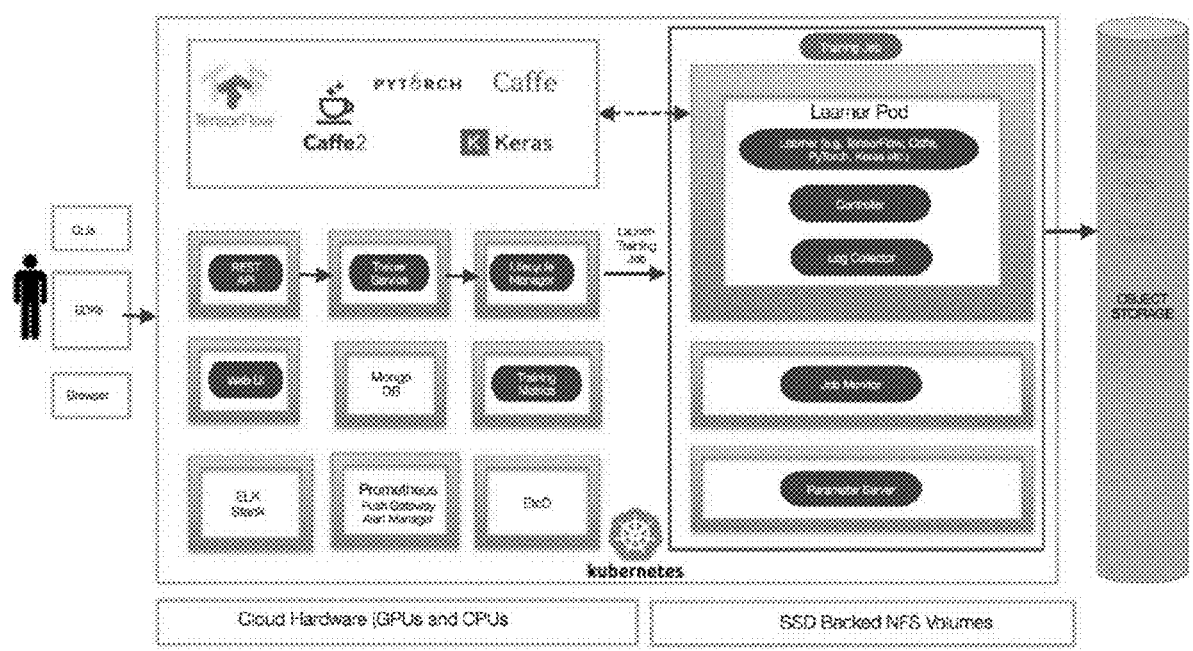
FIG. 3 illustrates an exemplary Arsenal system architecture.
Figure 4:
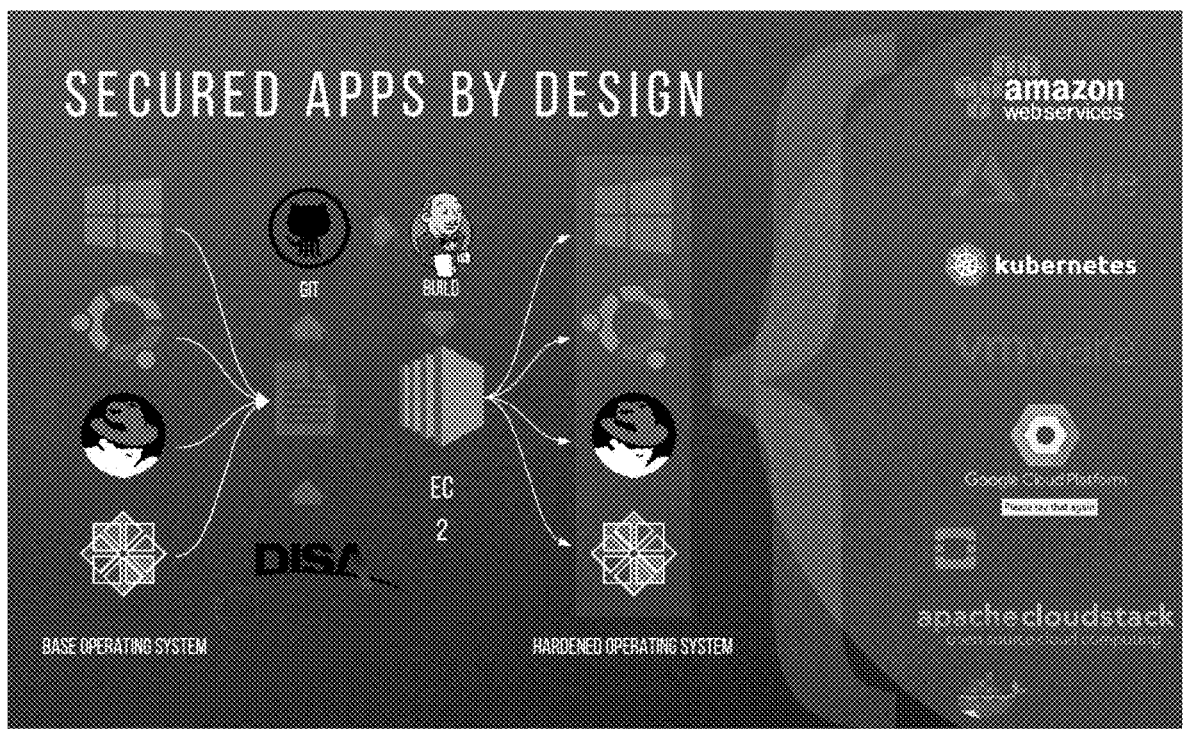
FIG. 4 illustrates an exemplary security configuration diagram.
Figure 5:
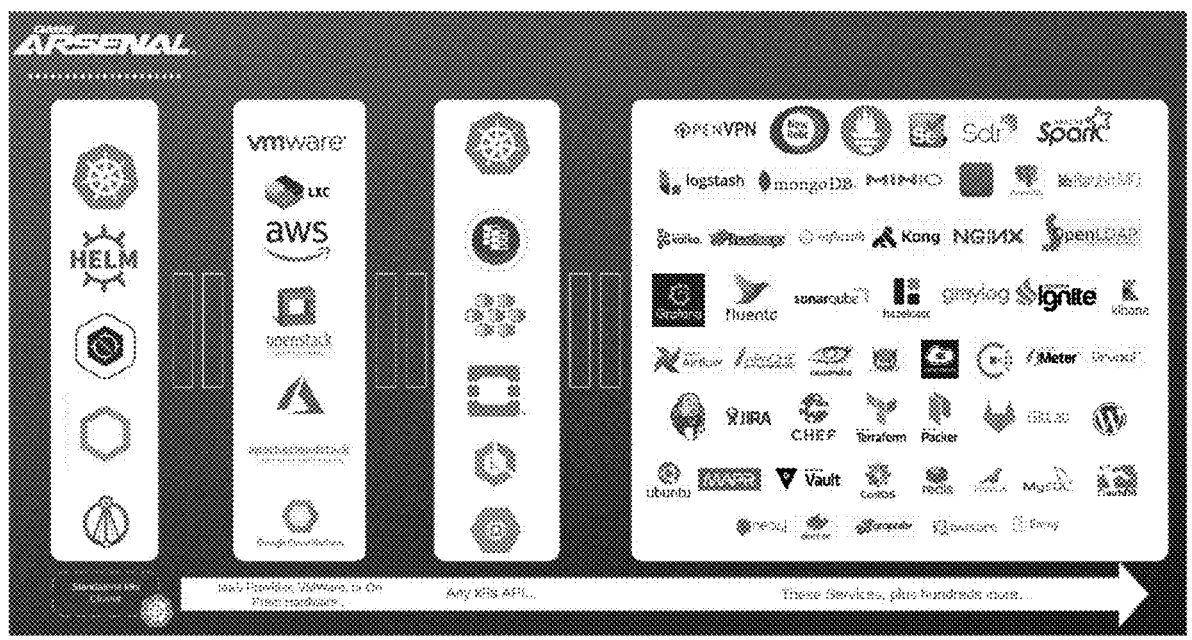
FIG. 5 is an illustration of exemplary platforms.
Figure 6:
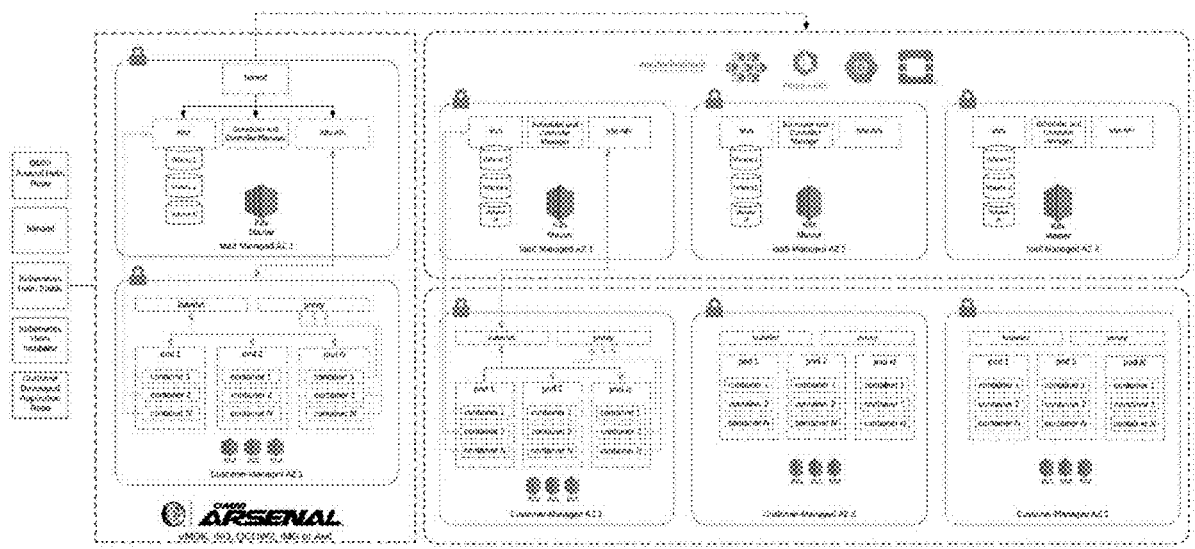
FIG. 6 is a block diagram illustration of an exemplary system architecture.
Figure 7:
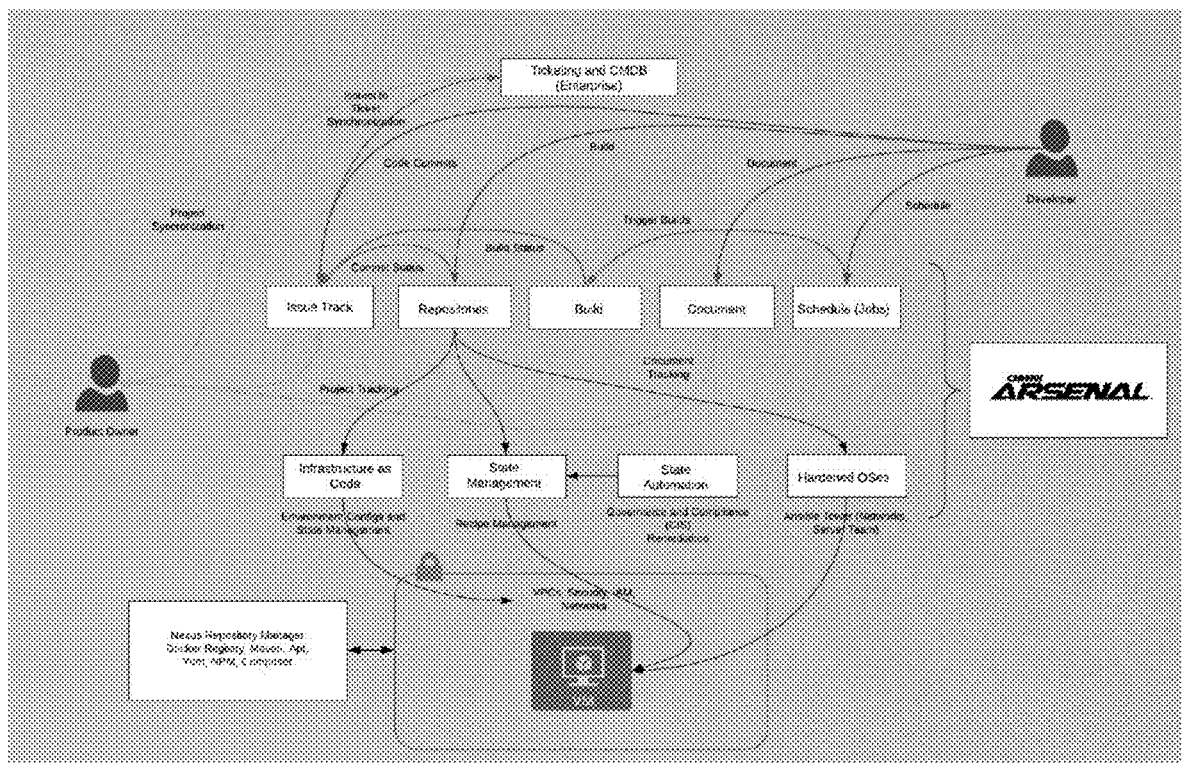
FIG. 7 is an exemplary code flow diagram.
Figure 8:
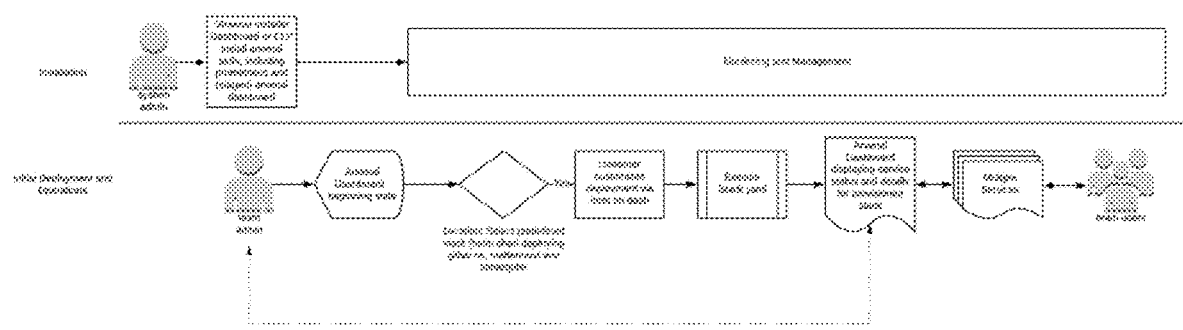
FIG. 8 is a flowchart of a first exemplary method of practicing embodiments of the invention.
Figure 9:
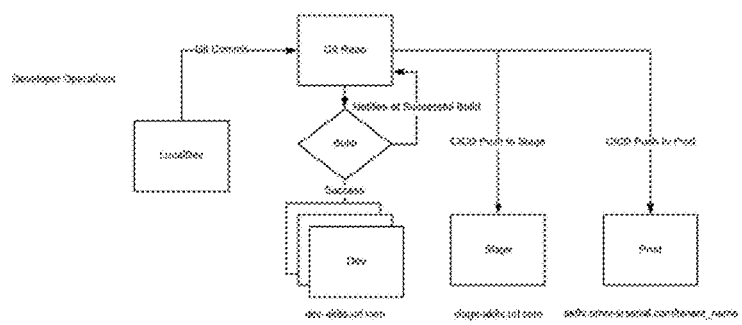
FIG. 9 is a flowchart of a second exemplary method of practicing the embodiments.
Figure 10A:
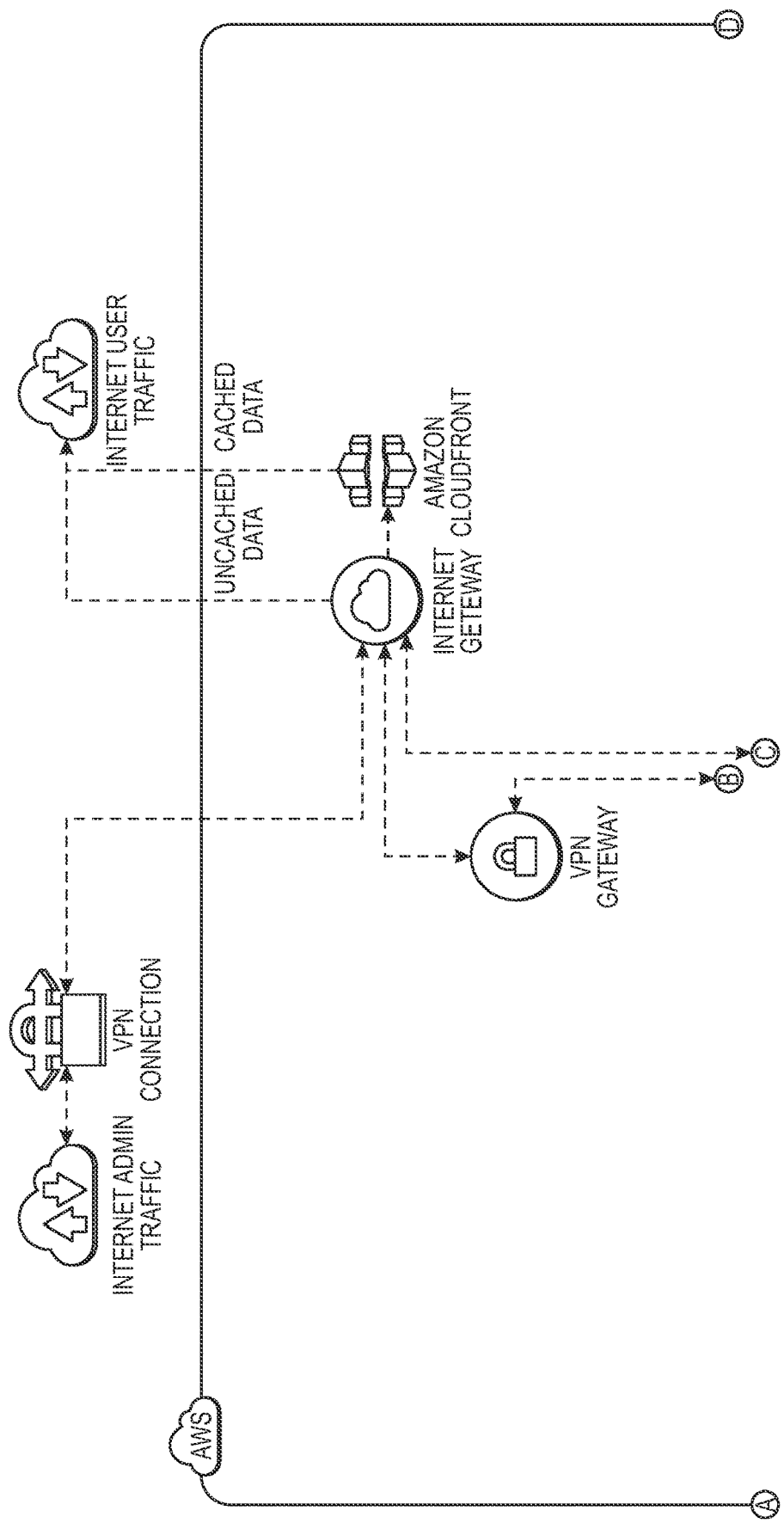
FIGS. 10A-10D is a block diagram of another exemplary system architecture.
Figure 10B:
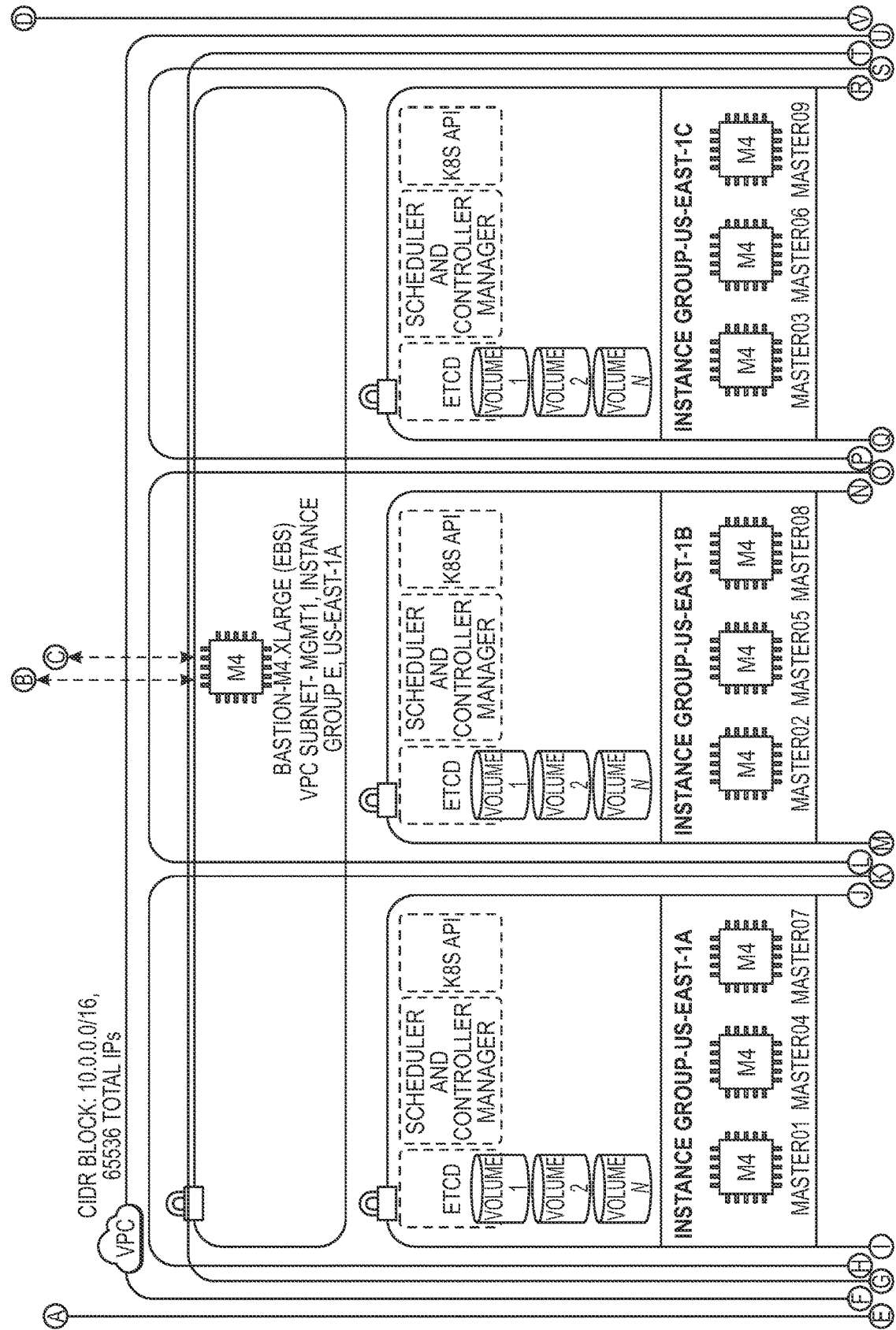
Figure 10C:
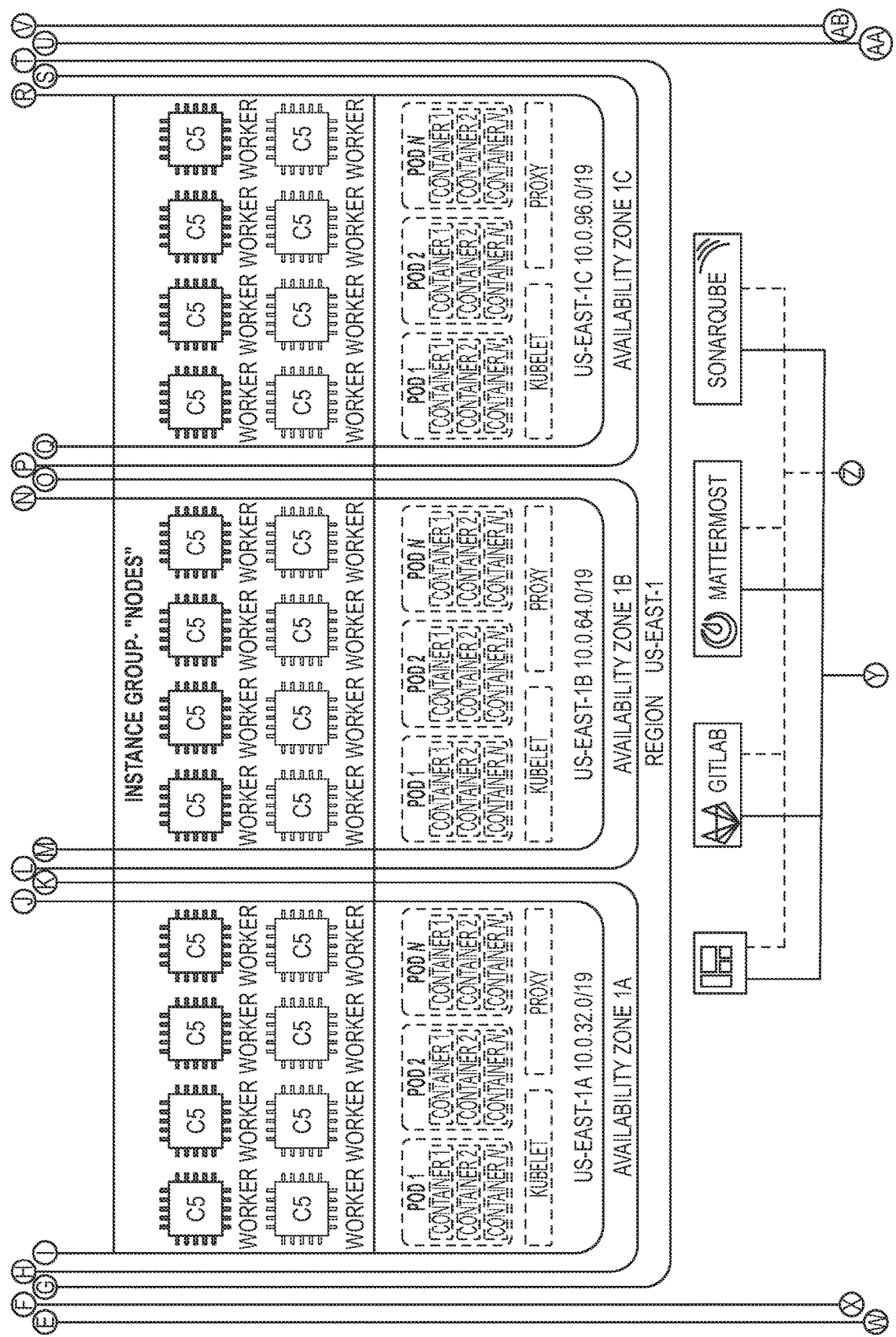
Figure 10D:
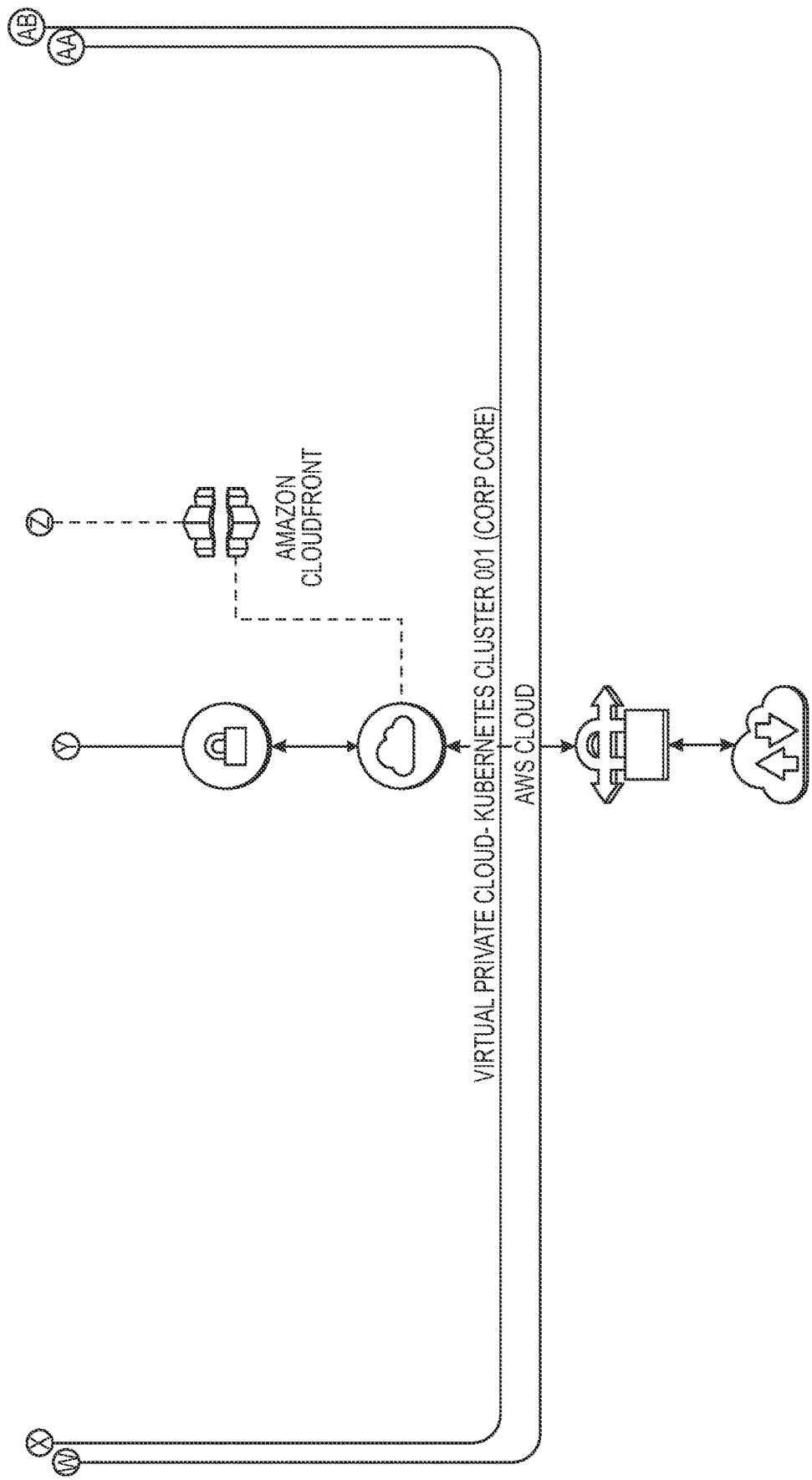
Figure 11:
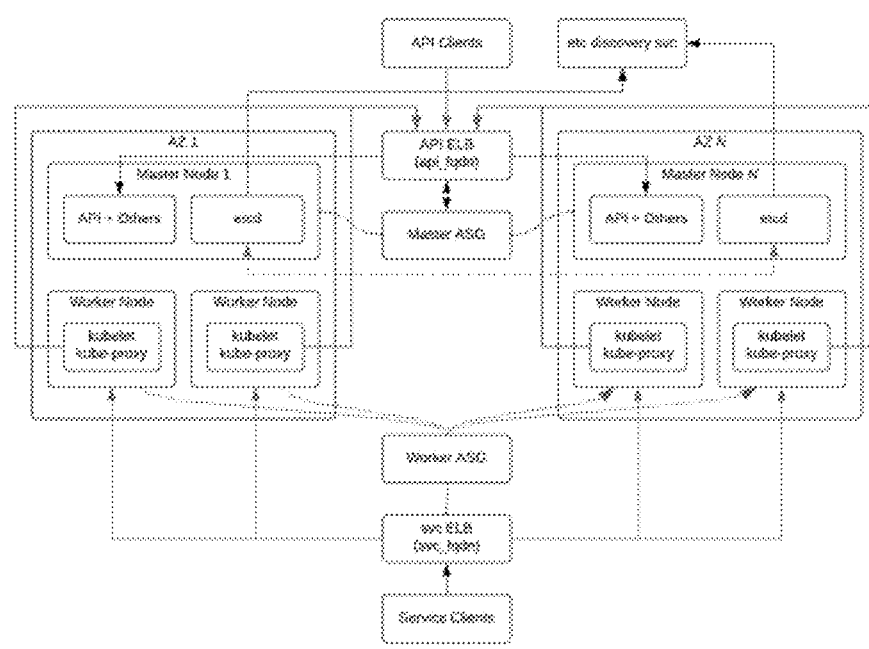
FIG. 11 is a block diagram of additional embodiments of the invention.
Figure 12A:
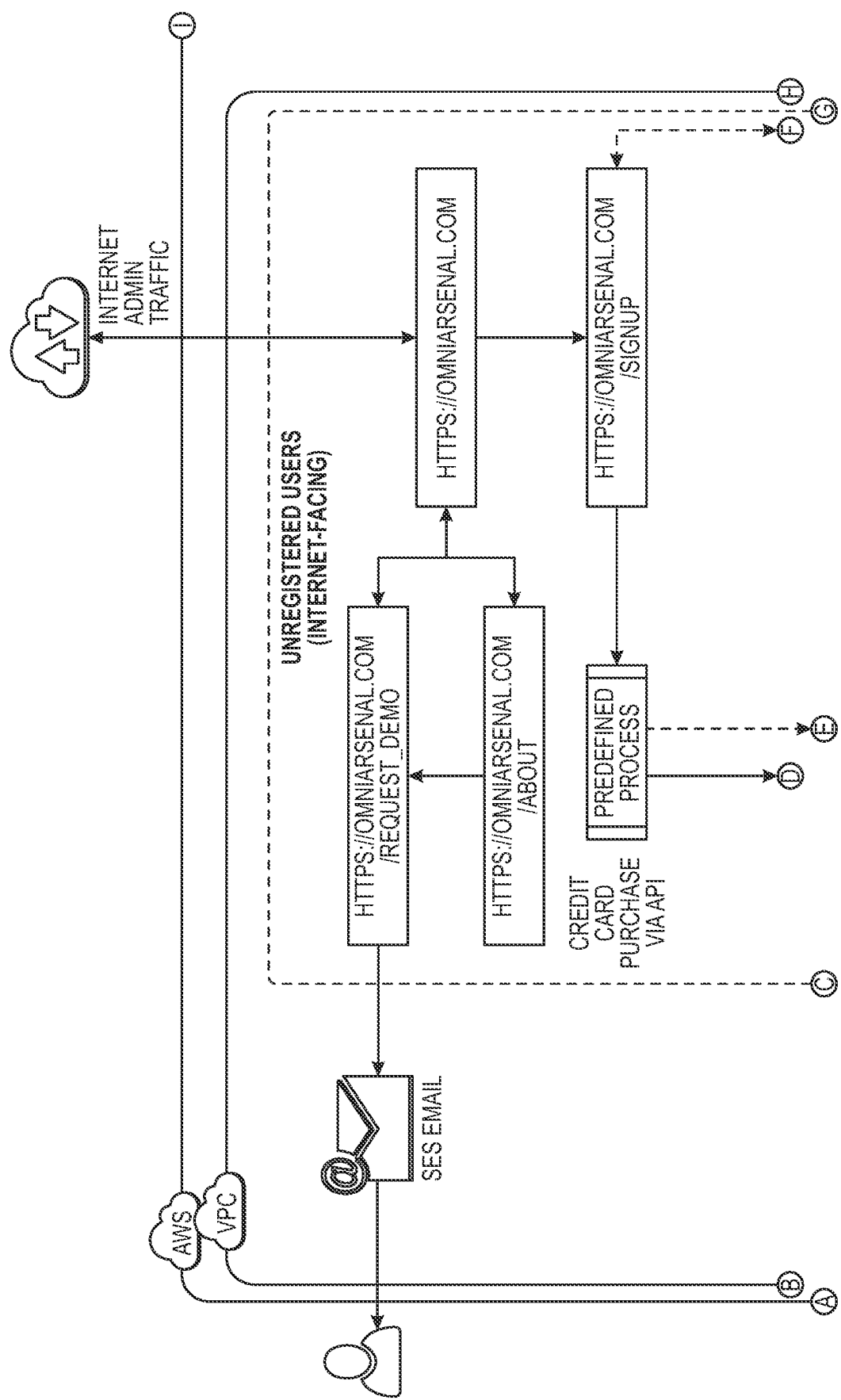
Figure 12C:
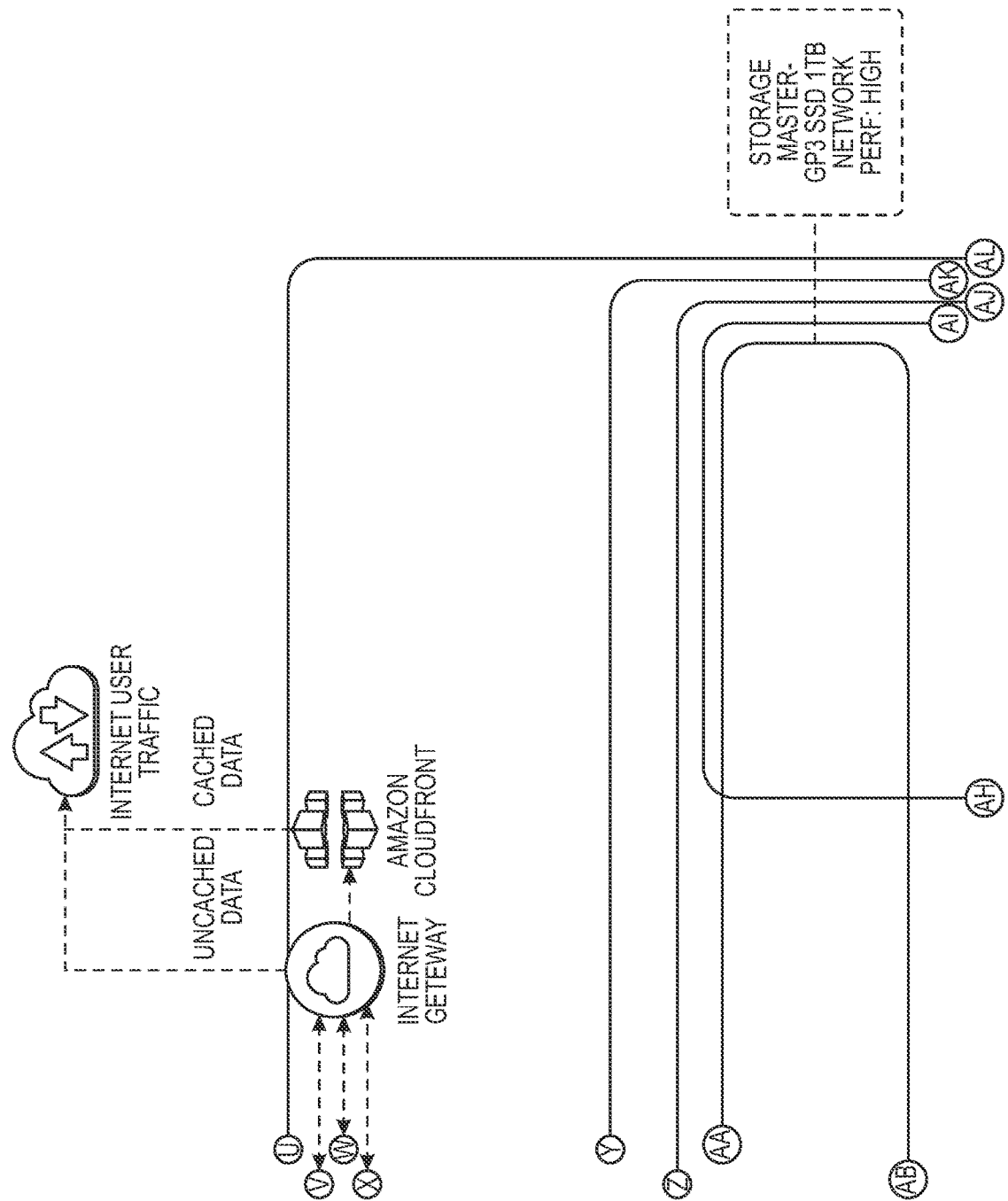
Figure 12D:
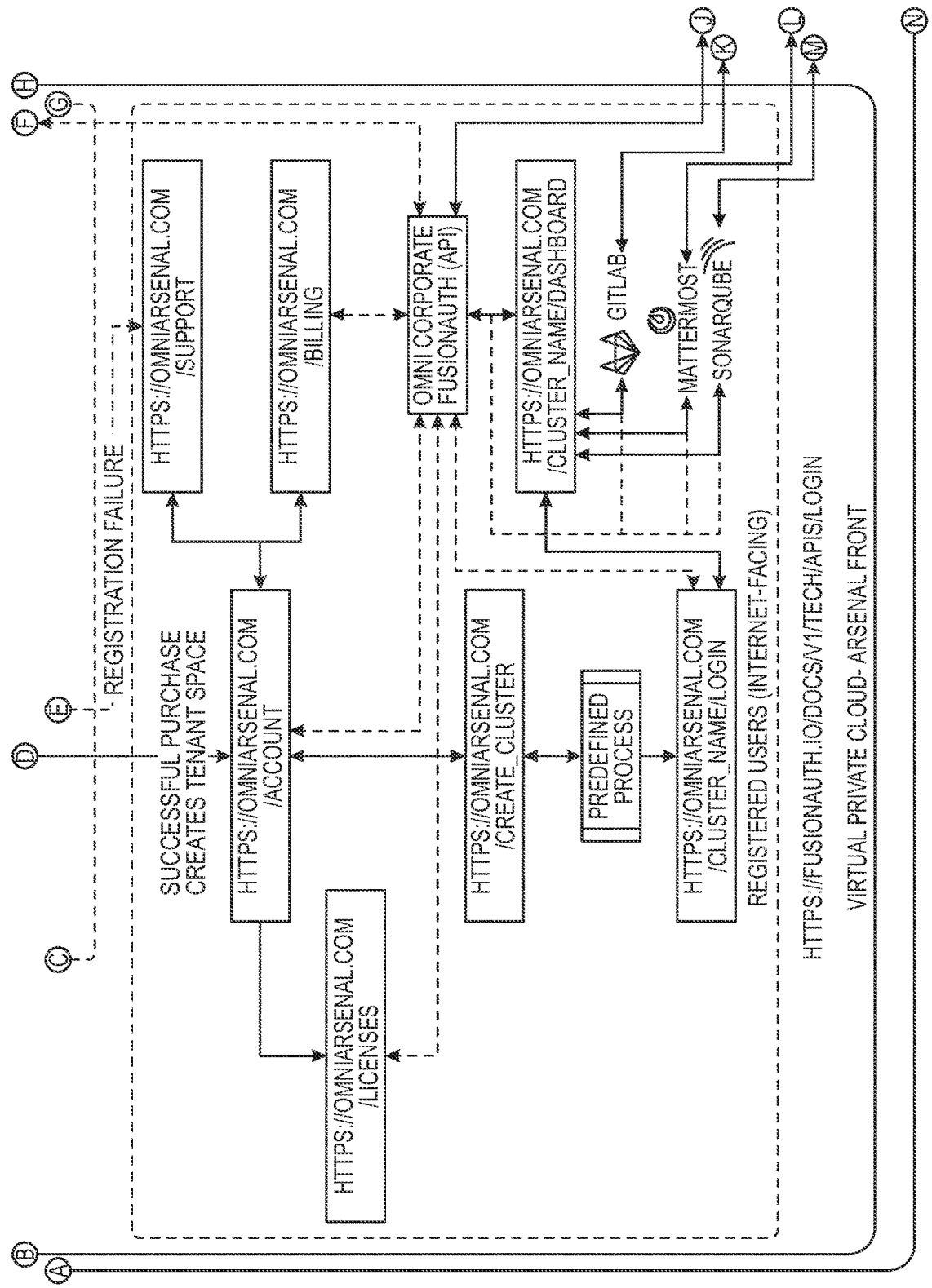
Figure 12E:
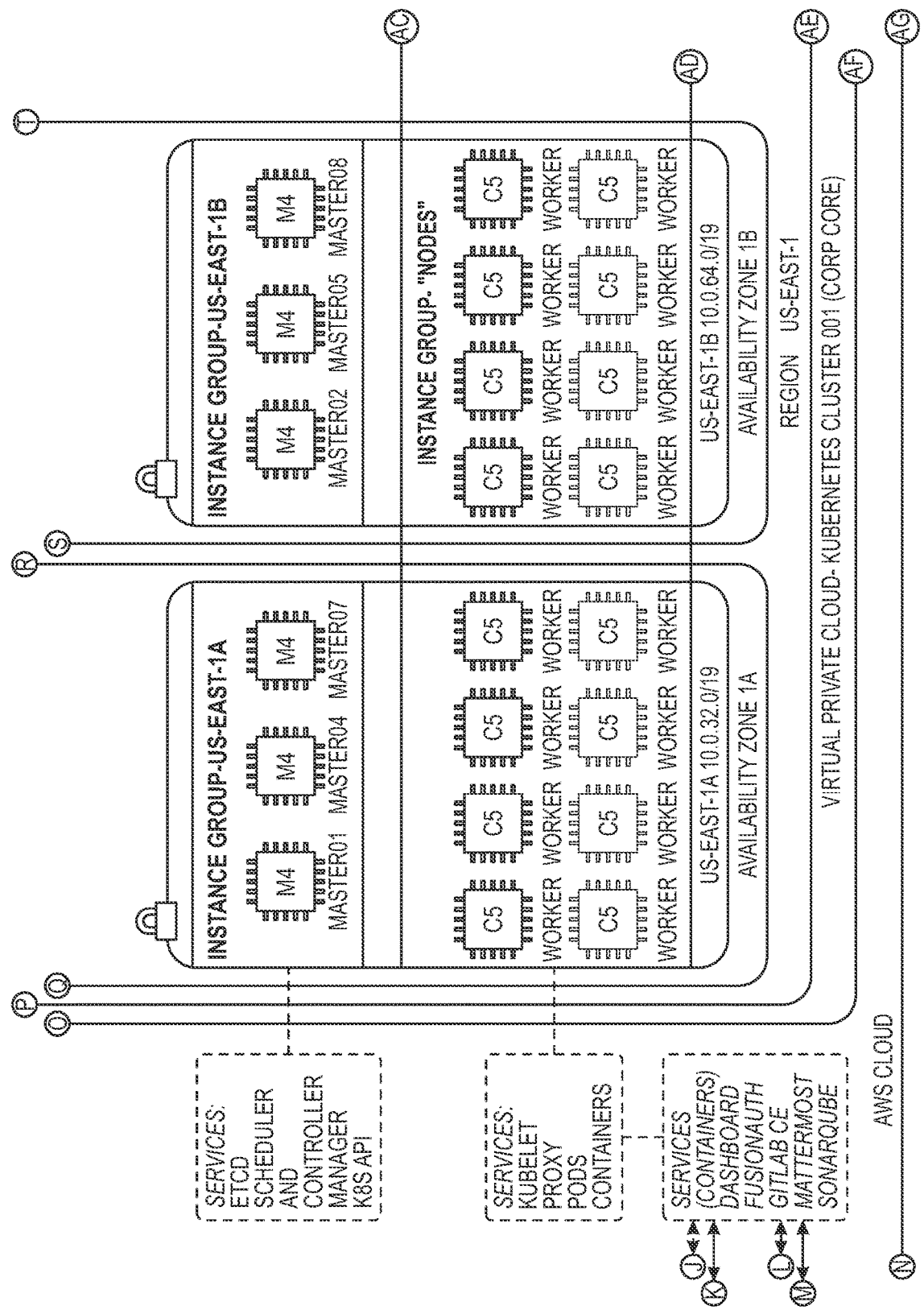
Figure 12F:
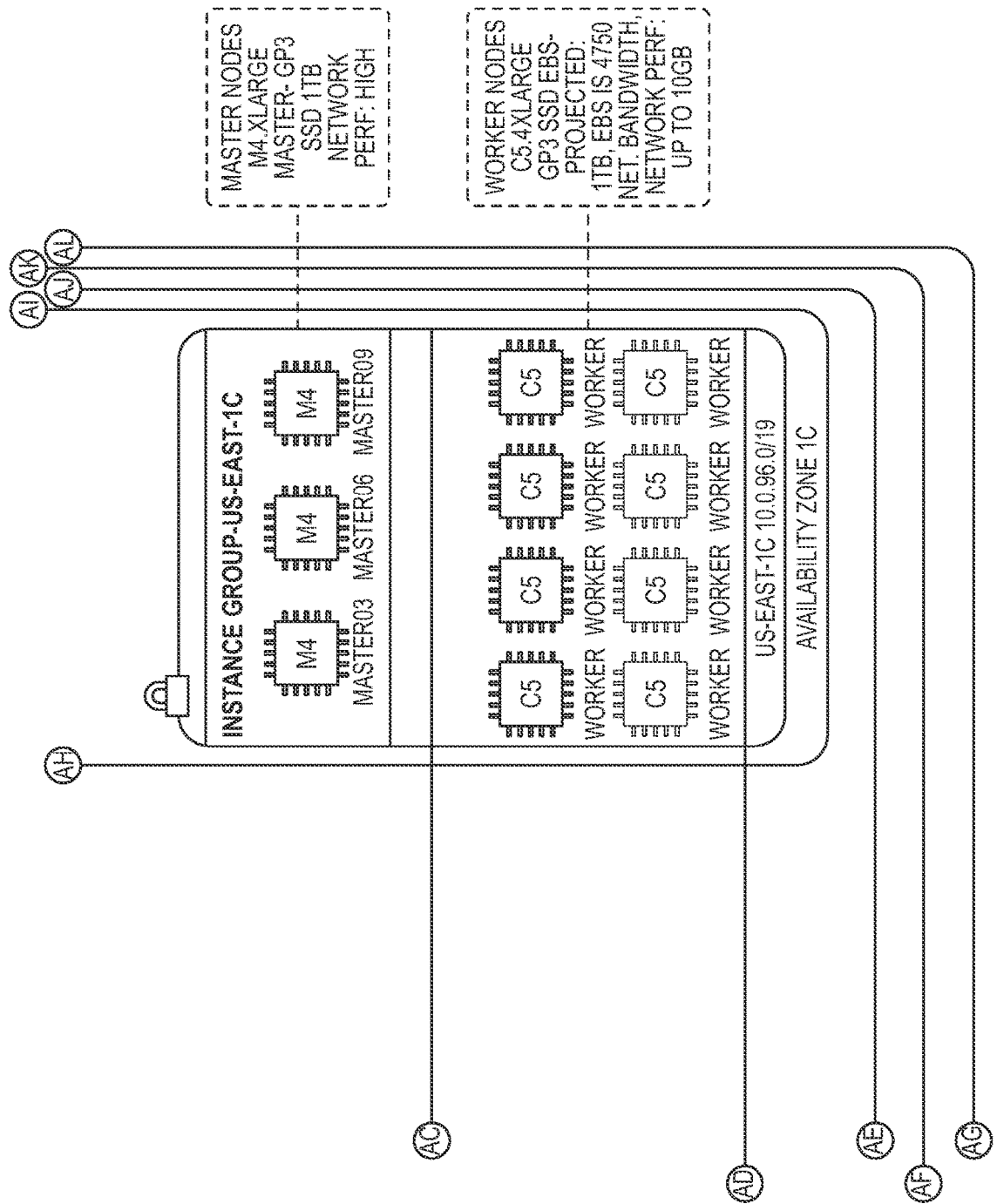
Figure 13:
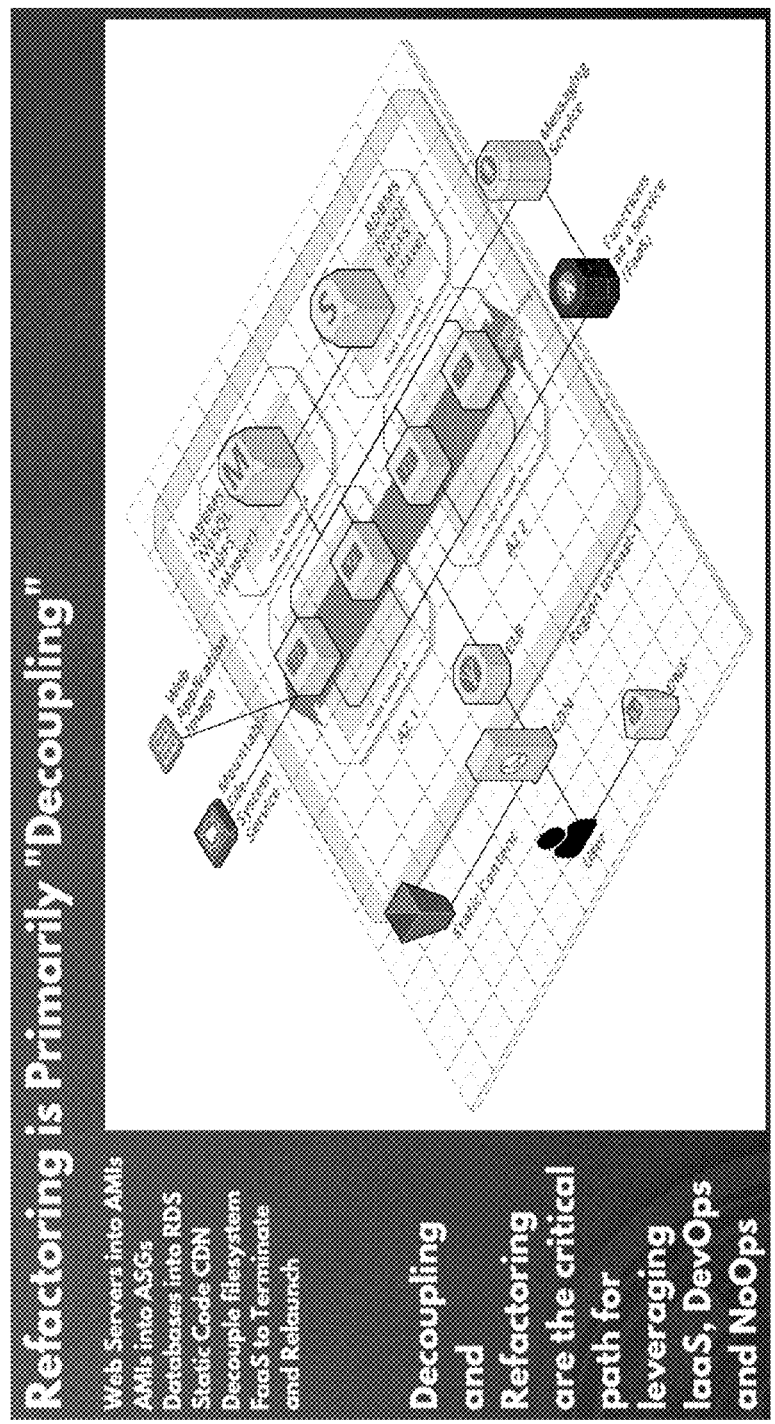
FIG. 13 is a system diagram of an exemplary decoupling and re-factoring system.

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

The embodiments of the present invention include software solutions related to integration. For example, the embodiments include solutions are open source and some solutions that are developed internally, as customized code. These solutions may integrate the customized code with something else or can represent a full up application that was developed. The inventors are also providing a variety of solutions that focus on different technologies, and others that involve methodologies representing important business processes.

These solutions are all related to development of a unified ecosystem for developers and other engineers as part of a DEVOPS and DEVSECOPS process to be able to execute these operations in a unified ecosystem. That is, the way DEVOPS is performed by many applications today, is that DEVOPS is includes multiple methods that are required to get to the end-state. Stated another way, a developer designs something, with someone on a keyboard writing computer code to perform specified functions. The embodiments provide methods and systems that facilitate how the developer orchestrates this code to be integrated so that it performs all required functions represents a specific method.

By way of example only, and not limitation, these methods can specify:

a. Where the code will be placed;

b. How the code will be orchestrated;

c. How the code will be evaluated or tested against specific industry practices and intellectual knowledge to ensure that it maps to specific compliance standards, or a combination of different industry standards; and d. How various pieces of the code will be tied together and how the end-state will be produced, what can be considered a secure application that has gone through the evaluation of different things to ensure that it maps to specific metrics specified on the user's organization.

The inventors of the embodiments described herein provide all of the capabilities and services above, employing these methods, packaged in one platform. In addition to the evaluation of the code against these standards, the embodiments also provide customized compliance.

Attributes of this customized compliance include intellectual knowledge representative of the developed code, along with how that code should be evaluated, and how an output of that evaluation is created. This provides the user with an understanding of what is happening with their code.

Aspects of the various embodiments can provide a high-level overview and other embodiments provide tools that offer granular details. The embodiments also include other unique methodologies of parts of this process. That is, this customized compliance is part of the code analysis platform.

By way of example, the user of this product will be able to set their own compliance as a benchmark and configure the tool to check or analyze the code based on these benchmarks. This feature provides the user the ability to define their organizational compliance standards. The user is provided all the industry standards they can discern about what is being evaluated. As a result, instead of the user having engineers to learn, use, and try to function with a multitude of different technologies to produce their end-state, the user will have one platform representing services, capabilities, and methodologies to build their desired end-state.

The embodiments also provide a capability to have solutions employed in a plurality of architectural formats. That is, if desired, the user can deploy the solutions in any cloud platform. For example, the solutions could be deployed in any multi-cloud platform, private platform, etc. Thus, the user is provided with the ability to build a solution that maps to the many functional ways of how the solution will be utilized.

The underlying goal is to build products and capabilities to perform in such a way that it does not matter what the underlying services and capabilities are. The underlying services and capabilities exist, but they simply need to meet a minimum specification, as noted above.

With respect to the example of Amazon, Microsoft, and Google above, and underlying tiers their respective platforms represent, the embodiments provide the ability to operate on top of those tiers. Some solutions, in accordance with the embodiments, are integrated inside of Amazon Web Services (AWS), and others are integrated inside of Google Cloud Platform (GCP).

However, the embodiments operate on top of (e.g., outside of) these respective platforms. Therefore, anything built in the ecosystem of the embodiments does not have to exist only in the AWS and GCP platforms, it can exist in other platforms as well. Thus, solutions constructed in accordance with the embodiments become agnostic to these platforms. The solutions of the embodiments merely utilize these platforms for an underlying infrastructure for distributed compute, storage, etc. —leveraging the original purposes of their designs.

A more difficult attribute is in an organization being able to define the specific security compliance standards so that everything, every piece of code evaluated, maps to specific standards the user's organization defines. This does not only include the industry code, nor what can be found in open source, nor what is being defined by the government (e.g., NIST, NSA etc.). It also includes how the organization itself may define specific governing how compliance should be implemented or mapped. The user has the ability to incorporate this into the measurement that will be provided. This ability helps to define and ensure that every piece of code going against either a certain project or a certain group of developers executing specific things for the organization, maps against the baselines provided.

By way of another illustrious example, the term phase-gates is well known and understood by those of skill in the art. This is understood to be an attribute of system engineering and is derived from a mathematical algorithm of methods NASA used to develop space systems. As used herein, the meaning of phase-gate is transformed to match current standards of how software and methods are constructed. That is, the inventors have incorporated the phase-gate process as part of another process that takes a paper method and turns it into a technical method.

Transforming the phase-gate process gives the user the ability to quantify and then qualify whether something has met the metrics of a particular gate or phase. If it has met the gate or phase, then it gets released technically and automatically to the next gate. If it fails to meet the gate or phase, then it returns to a queue for review before moving forward. These are development gates.

More specifically, the illustrious embodiments provide two general methods related to phase-gates. The first method includes software as a system. Under this method, a user can purchase a subscription giving them access to the software to employ specified services as part of a suite of software tools or services. There are three main categories with respect to what the suite of software tools or services provides, in accordance with the embodiments. Those categories include:
  a) the ability to create code inside of an environment (first gate);
  b) the ability to test and secure that code and evaluate it for its compliance against multiple standards (second gate); and
  c) the ability to deploy the code in an environment, whatever a user defines it as, as a customer (third gate).

Further embodiments of the invention provide the ability, once the code meets the first and second gates (i.e., satisfied their metrics and quantifying things) and they are ready to release that code, to deploy the code to any desired location. To deploy the code, the user can push a button, type in configuration measures, and literally have the code deployed to any desired location. This feature is derived from the paradigm of a multi-cloud implementation, where the user is provided the ability to deploy one implementation to one platform and another implementation to a different platform, where those locations do not have the same compute space. For example, those two different locations could be entirely different platforms.

The embodiments will employ the operations side (third gate), which provides the ability to define where the user wants the code to go, but then automatically configure it based upon specific measurements applied thereto.

As discussed in the limiting examples above, if the user is provided with code built within the Amazon platform, the user is limited to Amazon's ecosystem. This is because Amazon does not publicly expose various attributes of their underlying infrastructure's application programming interface (API). The user cannot take what they created inside of that ecosystem and put it someplace else. Depending upon what type of application the user is building, and how it is being constructed, the application may need to be re-factored.

As understood by a person of skill in the art, re-factoring means starting from scratch. The user may have the same use case, with the same functionality and features, but because the code is being placed inside of a different ecosystem, it may require re-factoring to function inside of this different ecosystem. Embodiments of the present invention agnostic to the underlying hardware and agnostic to various layers of the underlying ecosystem platform infrastructure.

As defined herein, the inventor's construct of multi-cloud, as an example, is being able to build an application with the ability to perform distributed computing across multiple platforms. In other words, being able to talk to Amazon, Microsoft, and Google at the same time.

In the embodiments, signals (e.g., representing the code) can be transmitted to Amazon, Microsoft, and Google, and can communicate with each company, have all transmissions representing an algorithmic understanding and/or perform specific functions based upon collectively not seeing the underlying infrastructure. The embodiments, the user can be provided an IP address that is generating a request, where the user has already validated the request, and everything is ready to function and operate (i.e., multi-cloud). The only way this can be achieved is performing at an abstract layer above the cloud providers' infrastructure, not being inside of their ecosystem.

Embodiments of the invention are provided to a user within a modular framework. That is, the embodiments include the ability for user to subscribe to one or many capabilities and solutions described herein. For example, at the click of a button, a user can perform code integration, although they may not desire to perform any other functions. At a later time, the user may desire to purchase the compliance solution component but still may not need the deployment. Finally, at an even later point, the user may desire to deploy the code and purchase the deployment solution. Thus, the user is provided a menu of services that facilitates selecting and paying for services based on their specific use case and need.

FIG. 1 illustrates a dev-ops system 100 for deploying cloud-agnostic customizable applications. The system dev-ops system 100 includes a development environment 101 in which one or more applications may be developed. The one or more applications may be developed according to distinct software development methodologies. For example, and not by limitation, one application may be developed in a Python programming environment whereas another application may be developed in a Ruby programming environment. These applications may be all part of a software suite that is configured to provide a set of desired functionalities when deployed to a cloud and subsequently executed by a user using a client machine communicatively coupled to said cloud.

The dev-ops system 100 may further include a back-end software engine 103 that is configured to render the applications developed in the development environment 101 agnostic to cloud configurations. For example, and not by limitation, the engine 103 is configured to render an application developed in the development environment 101 compatible for deployment and execution in either one of or all of clouds 105a, 105b, and 105c. These clouds may have distinct software architectures and/or communication protocols and as such, an application designed and deployed on the cloud 105a may not be run on the cloud 105b. Advantageously, the dev-ops system 100 allows an application to be developed in an agnostic manner, thereby allowing its deployment on markedly distinct clouds.

The dev-ops system 100 may further include client servers 107a, 107b, and 107c, which can fetch and execute a specified application deployed on either one or all of the clouds 105a, 105b, and 105c. On the client side, i.e. at the aforementioned client servers, a user may customize the application to suit his or her needs. Such customizations can include applying established or custom-enterprise standards configured to render the application secure for an intended use or to comply with enterprise or established compliance standards. Such customizations to the application may be made in agnostic manner such that they can be deployed on any one the clouds 105a, 105b, and 105c. Accordingly and advantageously, the dev-ops system 100 is configured to allow a deployed application is configured to allow application customization in a cloud agnostic manner.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A system, comprising:
    a first software environment stored in non-transitory computer media, the first software environment being configured for developing one or more applications according to a set of protocols associated with the first software environment and wherein the first software environment includes customizable sub-routines for implementing a specified security standard;
    a second software environment stored in the non-transitory computer media, the second software environment being configured to analyze the one or more applications, wherein an analysis performed in the second environment on a specified application from the one or more applications include determining whether the specified application passes a benchmark associated with a specified compliance standard; and
    a third software environment stored in the non-transitory computer media, the third software environment being configured to render the specified application deployable on a plurality of cloud environments, wherein the plurality of cloud environments includes cloud systems having different protocols;
    wherein the specified application is configured to function as a software-as-a-service platform when deployed on a specified cloud of the plurality of cloud environments;
    wherein the software-as-a-service platform includes customizable routines configured to allow a user to configure the specified application when it is deployed; and
    wherein the customizable routines are configured to allow the software-as-a-service platform to interface with multiple cloud environments.

2. The system of claim 1, wherein the specified security standard is a standard established by a standard-setting organization.

3. The system of claim 2, wherein the specified security standard is an enterprise-specific custom standard.

4. The system of claim 1, wherein developing the one or more applications is achieved according to a plurality of phase gates.

5. The system of claim 4, wherein the one more phase gates includes a code creation phase gate, a security phase gate, and deployment phase gate.

6. The system of claim 1, wherein the multiple cloud environments have different protocols or architectures.

* * * * *